(12) United States Patent
Martin et al.

(10) Patent No.: US 7,651,153 B2
(45) Date of Patent: Jan. 26, 2010

(54) DELIVERY VEHICLE

(75) Inventors: Roger Martin, Toronto (CA); Scott J. Vader, Toronto (CA)

(73) Assignee: Unicell Limited, Toronto, Ontario (CA)

( * ) Notice: Subject to any disclaimer, the term of this patent is extended or adjusted under 35 U.S.C. 154(b) by 322 days.

(21) Appl. No.: 11/488,483

(22) Filed: Jul. 18, 2006

(65) Prior Publication Data

US 2008/0018064 A1    Jan. 24, 2008

(51) Int. Cl.
*B60J 5/06* (2006.01)
*B60K 7/00* (2006.01)
*B60K 1/00* (2006.01)
*B60G 9/02* (2006.01)

(52) U.S. Cl. .................. 296/155; 180/65.6; 280/6.151; 280/124.116; 296/146.11

(58) Field of Classification Search .............. 280/6.151, 280/6.152, 6.157, 124.116, 124.128; 180/65.6; 296/146.1, 146.11, 155; 49/213, 226
See application file for complete search history.

(56) References Cited

U.S. PATENT DOCUMENTS

| | | | | |
|---|---|---|---|---|
| 1,481,405 | A * | 1/1924 | Anglada | 180/57 |
| 1,735,404 | A * | 11/1929 | Masury | 180/65.6 |
| 2,589,863 | A * | 3/1952 | Quartullo | 180/65.4 |
| 4,114,712 | A * | 9/1978 | Finta | 180/21 |
| 4,248,455 | A | 2/1981 | Manning | |
| 4,346,931 | A * | 8/1982 | Merkle | 296/148 |
| 4,934,733 | A * | 6/1990 | Smith et al. | 280/124.132 |
| 5,070,794 | A * | 12/1991 | Kunst et al. | 105/436 |
| 5,403,244 | A | 4/1995 | Tankersley et al. | |
| 5,765,859 | A | 6/1998 | Nowell et al. | |
| 5,924,504 | A * | 7/1999 | Ruppert et al. | 180/61 |
| 6,098,995 | A | 8/2000 | Danis | |
| 6,234,565 | B1 * | 5/2001 | Bryant et al. | 296/155 |
| 6,421,600 | B1 | 7/2002 | Ross | |
| 6,443,072 | B2 * | 9/2002 | Rizk | 105/343 |
| 6,591,760 | B2 * | 7/2003 | Brunooghe | 105/341 |
| 6,753,777 | B2 * | 6/2004 | Li | 340/552 |
| 6,808,033 | B2 * | 10/2004 | Dare-Bryan | 180/65.6 |
| 7,168,754 | B2 * | 1/2007 | Hinton | 296/147 |
| 2002/0113382 | A1 * | 8/2002 | Dosdall | 280/6.151 |
| 2006/0055206 | A1 * | 3/2006 | Morrow et al. | 296/190.11 |
| 2006/0197357 | A1 * | 9/2006 | Catania | 296/155 |

* cited by examiner

*Primary Examiner*—Paul N. Dickson
*Assistant Examiner*—George D. Spisich
(74) *Attorney, Agent, or Firm*—Cesari and McKenna, LLP (57) ABSTRACT

A vehicle has a body and at least two trailing arm suspensions, one proximate each side of the body. Each trailing arm suspension has a swing arm pivotably mounted at one end to the body and a fluid suspension extending between the swing arm and the body. A wheel is rotatably mounted to a free end of each swing arm. A power plant is provided for powering each wheel and a control system is provided for controlling a volume of fluid in each fluid suspension. The vehicle may have a longitudinally extending body with a sliding side door riding along a track configured such that said door has an open position extending transversely of said body. The vehicle may have a monocoque body with at least substantially planar sides and at least one parcel shelf extending along an inside of, and attached to, each of the sides for stiffening the sides and resisting torsion.

27 Claims, 13 Drawing Sheets

DELIVERY VEHICLE

BACKGROUND

This invention relates to a delivery vehicle.

In urban centers, delivery vehicles are commonly used for the delivery of parcels, such as boxes. Typically the vehicle operator is able to access the cargo bay of the vehicle through a passageway from the operator's cab in order to retrieve smaller parcels: the operator may then exit through a side door of the vehicle to deliver the parcels. For larger deliveries, such as the delivery of a number of boxes, the operator typically exits the vehicle, walks to the rear of the vehicle, and opens a rear vehicle door. The operator may then retrieve a handcart, which may be inside the cargo bay or latched to the back of the vehicle, and position the handcart behind the vehicle. Next the boxes that form the delivery may be retrieved from the cargo bay and stacked on the handcart. Lastly, the operator may transport the stacked boxes with the handcart to complete the delivery.

Advantageously, a delivery vehicle has a single level floor. This typically requires that the floor be held about 30" (76 cm) above the ground to provide a sufficient clearance above the drive train—and especially, the differential—to allow for a suitable suspension. This floor height typically means an operator negotiates two or three steps each time he enters or leaves the vehicle. As an operator fatigues, these steps increase risk of injury.

Although delivery vehicles may allow for the delivery of goods in an urban center relatively efficiently, it is desirable to increase this efficiency. Furthermore, considerable strain is put on the operator of the delivery vehicle over the course of a day and anything which could lessen this strain (and therefore possibly reduce risk of injury) would be desirable.

SUMMARY OF INVENTION

A vehicle has a body and at least two trailing arm suspensions, one proximate each side of the body. Each trailing arm suspension has a swing arm pivotably mounted at one end to the body and a fluid suspension extending between the swing arm and the body. A wheel is rotatably mounted to a free end of each swing arm. A power plant is provided for powering each wheel and a control system is provided for controlling a volume of fluid in each fluid suspension.

The vehicle may have a longitudinally extending body with a sliding side door riding along a track configured such that the door has an open position extending transversely of the body. The vehicle may have a monocoque body with at least substantially planar sides and at least one parcel shelf extending along an inside of, and attached to, each of the sides for stiffening the sides and resisting deflection and torsion.

In the vehicle, the wheel well for the wheel may have a sufficient height and the fluid suspension may provide the swing arm with a sufficient stroke such that said fluid suspension may allow said wheel to retract until a portion of the body contacts the ground.

The fluid suspension may be an air bag.

The power plant may be an electric motor mounted to each of the trailing arm suspensions.

The at least two trailing arm suspensions may comprise a driver's side rearward trailing arm suspension to which a driver's side rear wheel may be mounted and a passenger's side rearward trailing arm suspension to which a passenger's side rear wheel may be mounted and wherein the noted portion of the body may be a rear end of the body.

The vehicle may further comprise; for each trailing arm suspension, a drive train between an output shaft of the electric motor supporting a pinion meshing with a face gear joined to a hub of the wheel.

The body of the vehicle may have a rear door, which may open upwardly.

The body may be a monocoque body which may have at least substantially planar sides.

The vehicle may have at least one parcel shelf extending along an inside of, and attached to, each of the planar sides for stiffening the planar sides and resisting deflection and torsion.

The vehicle body may have a planar bottom section, a top surface of said bottom section acting as a floor.

The floor may be a planar uninterrupted floor from a side door of the vehicle through to a rear door of the vehicle.

The vehicle may have a fin pivoted at a rearward edge of the planar bottom section.

The fin may have at least one wheel projecting beyond its outer edge and projecting rearwardly of a pivot axis of the fin.

The rearward end of the lower sliding door section may ride along a J-shaped track.

The vehicle may further comprise a steering linkage having a link arm and the body may comprise stiffening bars below the bottom section and one or more of said stiffening bars may be provided with a through bore through which said link arm may extend.

A pivot mounting one end of one of the swing arms to the body, at least while each rearward trailing arm suspension maintains said body in a generally horizontal orientation, may lie on or proximate a line between a ground contact point of each said rear wheel of the vehicle and a point of intersection of (i) a vertical line passing through a centreline of front wheels of the vehicle and (ii) a horizontal line passing through the centre of gravity of the vehicle.

According to another aspect of the present invention, there is provided a vehicle comprising a driver's cab positioned forwardly of a pair of front wheels; a steering linkage for said front wheels having a link arm; a body having a planar bottom section, a top surface of said bottom section acting as a floor, the floor being planar and uninterrupted from a vehicle side door opposite a driver's seat and a vehicle rear door, the body comprising stiffening bars below said bottom section, one or more of said stiffening bars being provided with a through bore through which said link arm extends; and a kneeling suspension between each rear wheel and said body.

According to another aspect of the present invention, there is provided a vehicle having a longitudinally extending body with a sliding side door riding along a track configured such that said door has an open position extending transversely of said body.

The sliding side door may open rearwardly, extend forwardly of a front passenger-side wheel of the vehicle, and extend at least up to a level of the front passenger-side wheel.

The sliding side door may be a lower sliding door section, and may further comprise a separate upper sliding door section extending above the front passenger-side wheel, the lower sliding door section being hinged at its forward end to the upper sliding door section.

The upper sliding door section may ride along a track such that the upper sliding door section may have an open position extending longitudinally of the body and directly over said front passenger-side wheel.

The upper sliding door section may ride along a linear track such that said upper sliding door section may have an open position extending longitudinally of said body directly over said front passenger-side wheel and wherein a rearward end of said lower sliding door section may ride along a J-shaped track.

According to a further aspect of the invention, there is provided a vehicle with a monocoque body with at least substantially planar sides and at least one parcel shelf extending along an inside of, and attached to, each of said at least substantially planar sides for stiffening said at least substantially planar sides and resisting deflection and torsion.

Other features and advantages will become apparent from a review of the following description in conjunction with the drawings.

BRIEF DESCRIPTION OF THE DRAWINGS

In the figures which illustrate example embodiments of the invention.

DETAILED DESCRIPTION

As battery technology improves, electrically powered vehicles are becoming feasible for an increasing variety of roles. One embodiment of this invention seeks to take advantage of improved battery technology to provide an electrically powered delivery vehicle. To simplify construction, an electric motor may directly drive each drive wheel of the vehicle; this removes both the need for a motor under a hood in front of the driver's cab and for a differential. Without a motor in front of the drivers cab, the front end weight is sufficiently reduced such that the driver's cab may be positioned forwardly of the front wheels. This has the advantage of reducing the wheel base, and therefore the turning radius. An example electrically powered delivery vehicle is illustrated in the figures.

Figure 1:
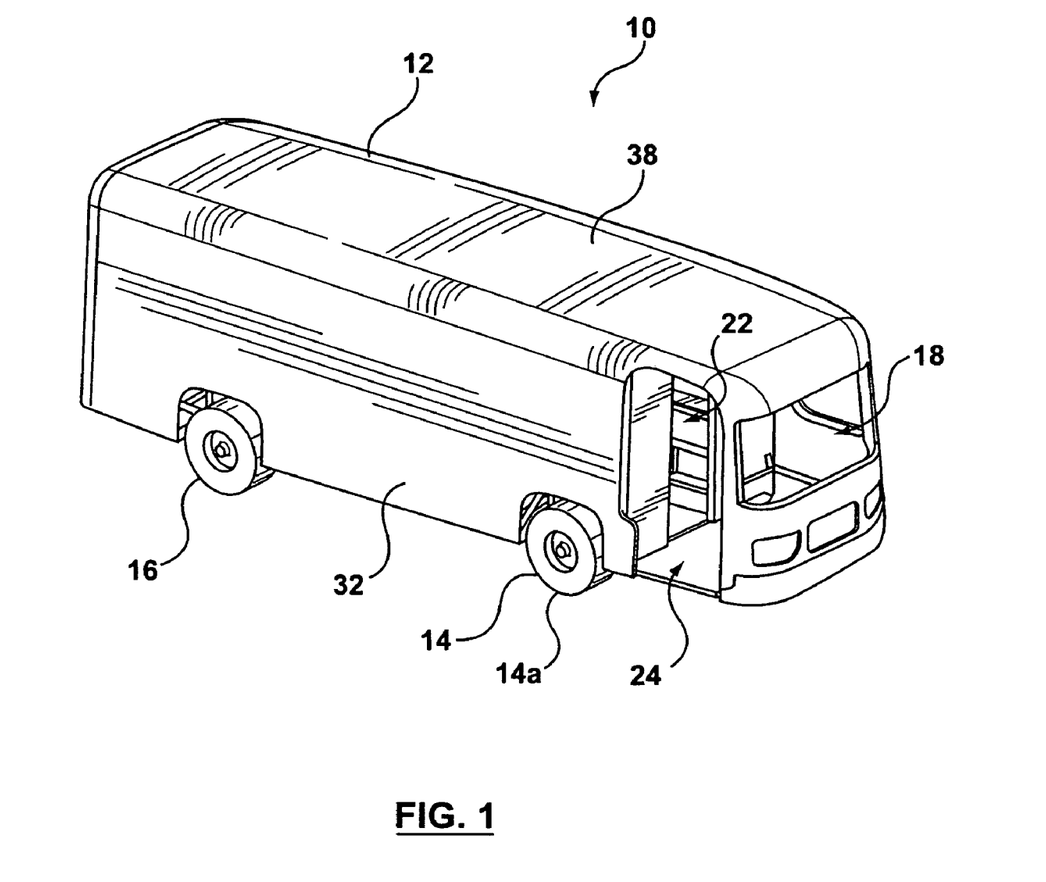
FIG. 1 is a perspective view of a delivery vehicle made in accordance with this invention.
Figure 2:
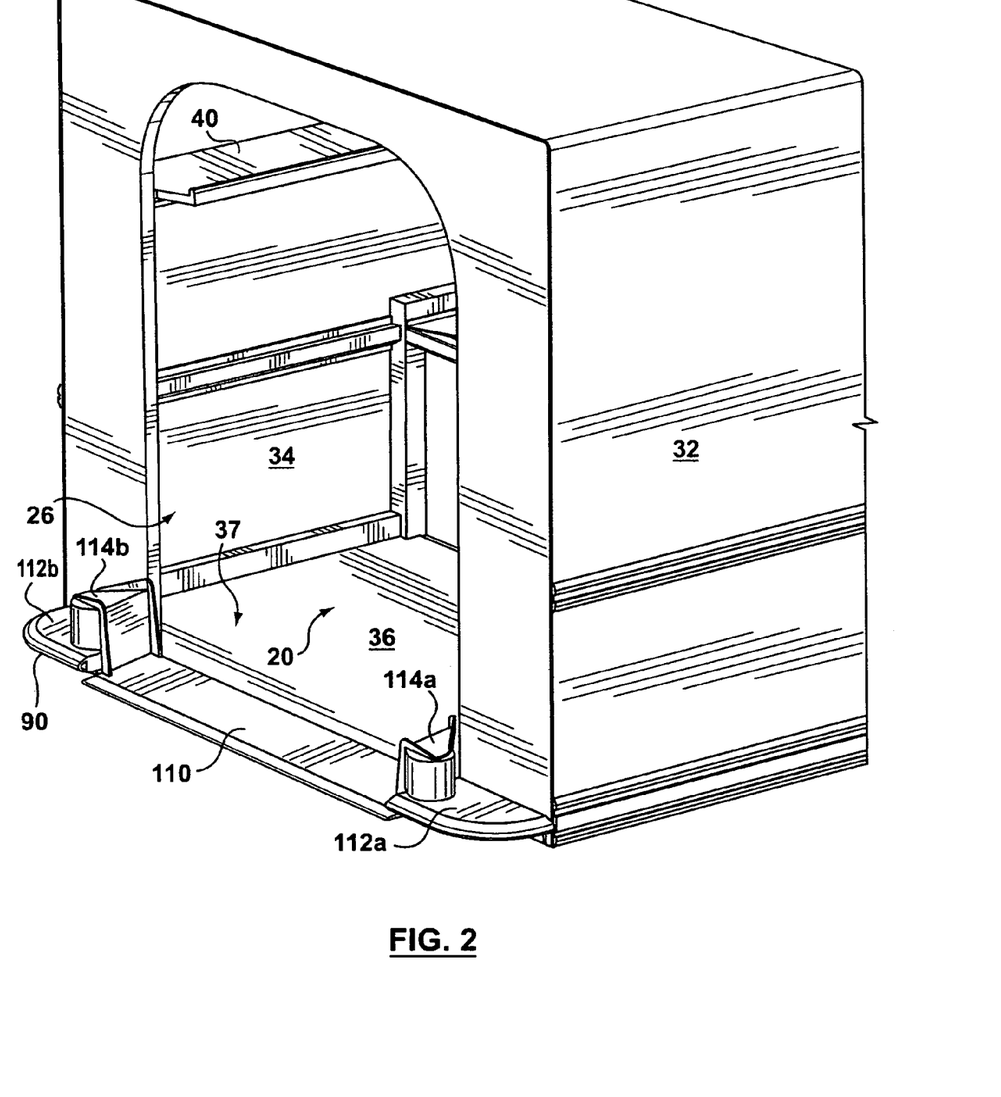
FIG. 2 is a fragmentary perspective view of a portion of the vehicle of FIG. 1.

Turning to FIGS. 1 and 2, delivery vehicle 10 may have a longitudinally elongated body 12 with non-powered front wheels 14 and powered rear wheels 16. The vehicle may have a driver's cab 18 positioned forwardly of the front wheels and a cargo bay 20. The driver's cab may have a cab-to-cargo doorway 22 and a side doorway 24, which doorway is positioned forwardly of the front wheels. The vehicle may also have a rear doorway 26.

Figure 3:
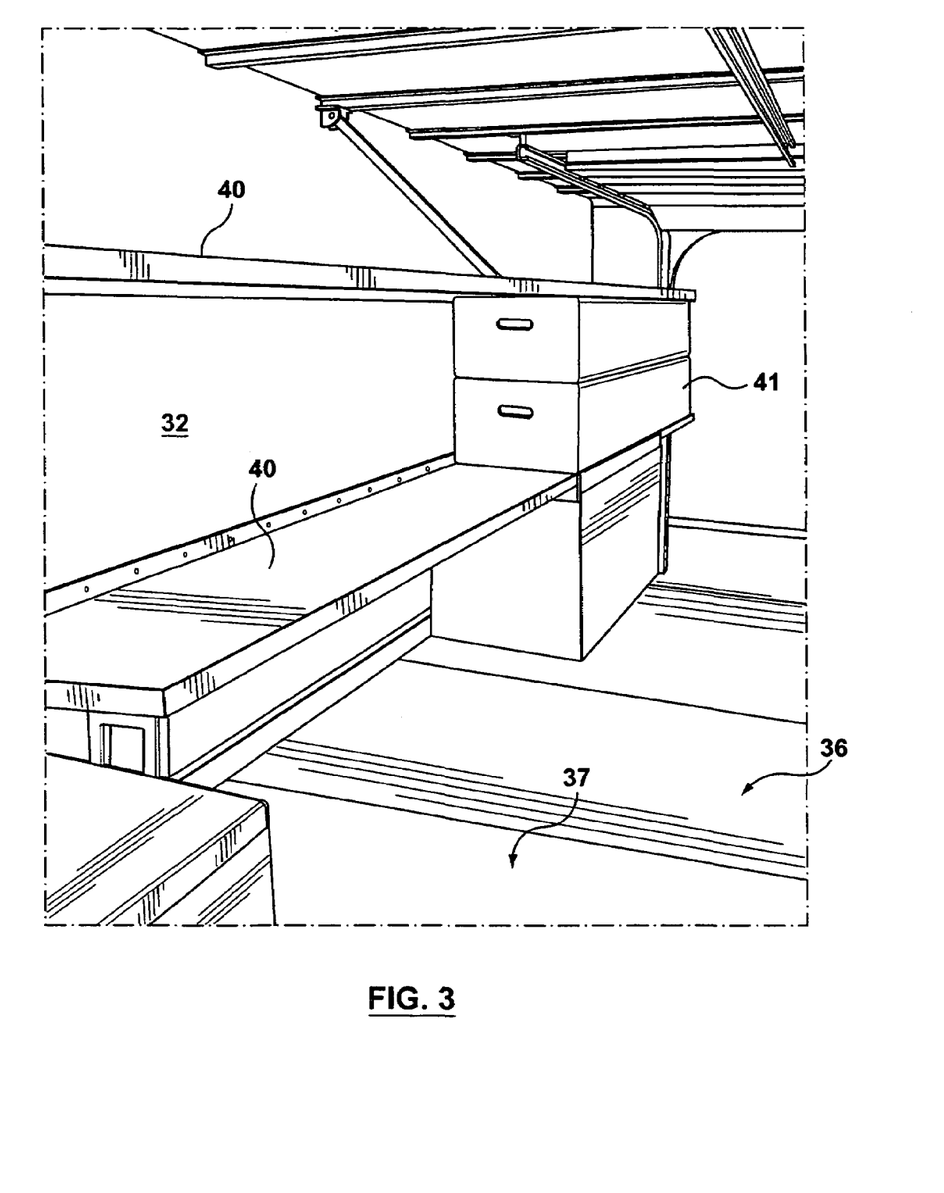
FIG. 3 is a perspective view of a portion of the interior of the vehicle of FIG. 1.

The body 12 may be a monocoque body, meaning that the external skin of the body at least partially supports the body itself as well as cargo carried in the cargo bay 20. To act as a monocoque body, the side walls 32, 34, bottom section 36, and roof 38 of the body are firmly joined together. The whole body thereby acts as a single beam. When the vehicle is loaded, the bottom section is put in tension, the roof in compression, and the side walls in shear. To maximize cargo carrying space, the side walls 32, 34 of the body may be planar, or at least substantially planar. With reference to FIG. 3 along with FIG. 2, parcel shelves 40 may be attached to, and run along, the inside of the side walls 32, 34 in order to stiffen these walls and resist deflecting and torsional forces that might otherwise be problematic with planar side walls. By way of example, the side walls may be fiberglass sheets.

A monocoque body allows construction of the vehicle without a full frame. More specifically, long sills may be avoided which allows the vehicle to have a lower floor, that is, a floor 37 that is closer to the ground than a vehicle having a full frame. The absence of a differential allows the floor to be lower still as compared with a vehicle with a differential. Indeed, the monocoque body and lack of differential allows a single level floor about 14" (35.5 cm) above ground. A lower floor reduces operator strain in entering and leaving the vehicle. And for a kneeling vehicle, a lower floor reduces the kneeling angle relative to the horizontal and, therefore, the vertical distance that must be traversed for the vehicle to complete a kneeling operation.

FIG. 3 also illustrates batteries 41 to power the electric motors housed in the cargo bay.

Figure 4:
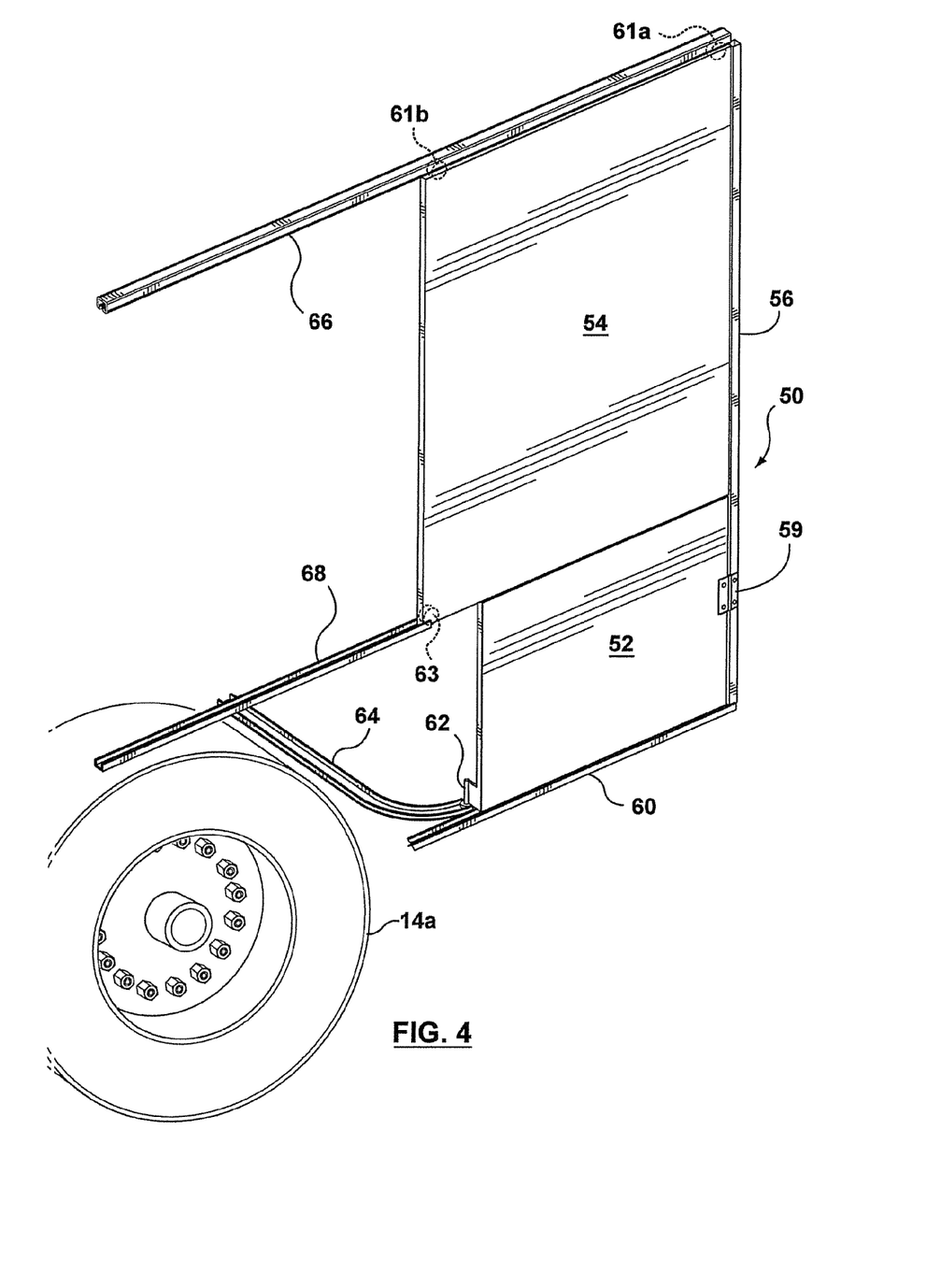
FIG. 4 is a fragmentary perspective view of another portion of the vehicle of FIG. 1.

A consequence of a low floor is that the side door way 24, which is positioned forwardly of the passenger-side front wheel 14a, extends below the top of this front wheel 14a. This would not be problematic if the side door opened outwardly (as may be achieved by, for example, a four bar linkage), but an outwardly opening door might be undesirable for an urban delivery vehicle. The side door of FIG. 4 resolves the potential dilemma. Turning to FIG. 4, side door 50 may have a lower door section 52 and an upper door section 54. The lower door section may be at the level of the passenger-side front wheel 14a and the upper door section may extend above this front wheel.

The front edge of the upper door section may fixed to a support bar 56 and the front edge of the lower door section may be hinged to the support bar by a hinge 59 (shown schematically). The lower end of the support bar rides in a lower linear track 60. A bearing 62 may extend downwardly from proximate the rear edge of the lower sliding door section 52 to ride in a lower J-shaped track 64. A pair of bearings 61a, 61b may extend upwardly from proximate the front and rear edges of the upper sliding door section 54 to ride in upper linear track 66. And a bearing 63 may extend downwardly from proximate the rear edge of the upper sliding door section 54 to ride in medial linear track 68.

With this arrangement, when door 50 is drawn rearwardly from its closed position illustrated in FIG. 4, upper door section 54 simply slides in a longitudinal direction over wheel 14a. However, the rear of lower door section 52 swings inwardly as the rear of this door section moves along J-track 64. In consequence, the lower door section pivots about its forward hinge as it opens so that it has an open position extending transversely of body 12. The result is a door that splits during opening.

Figure 5:
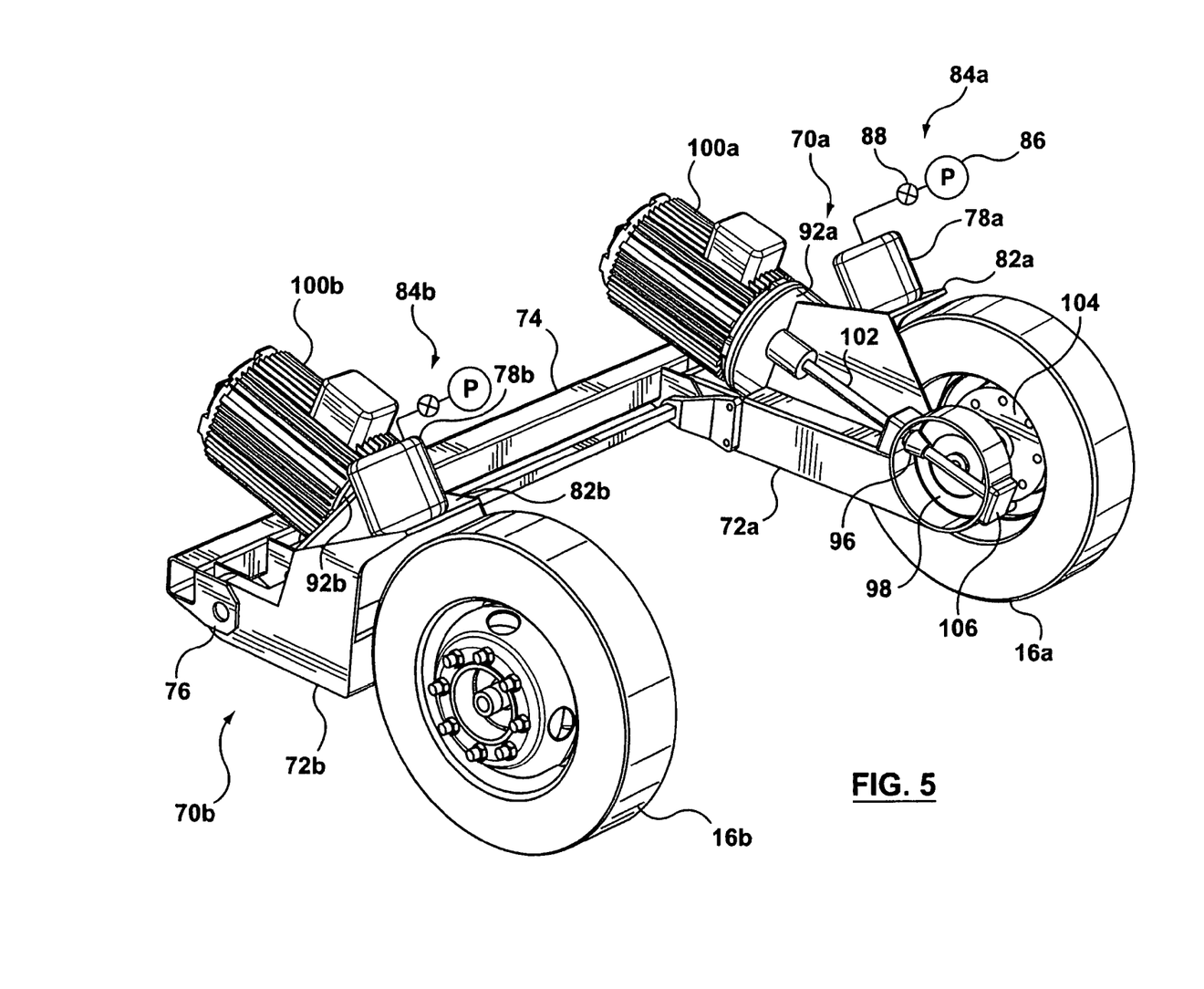
FIG. 5 is a perspective view of another portion of the vehicle of FIG. 1, FIGS. 6 and 7 are fragmentary perspective views of another portion of the vehicle of FIG. 1.
Figure 7:
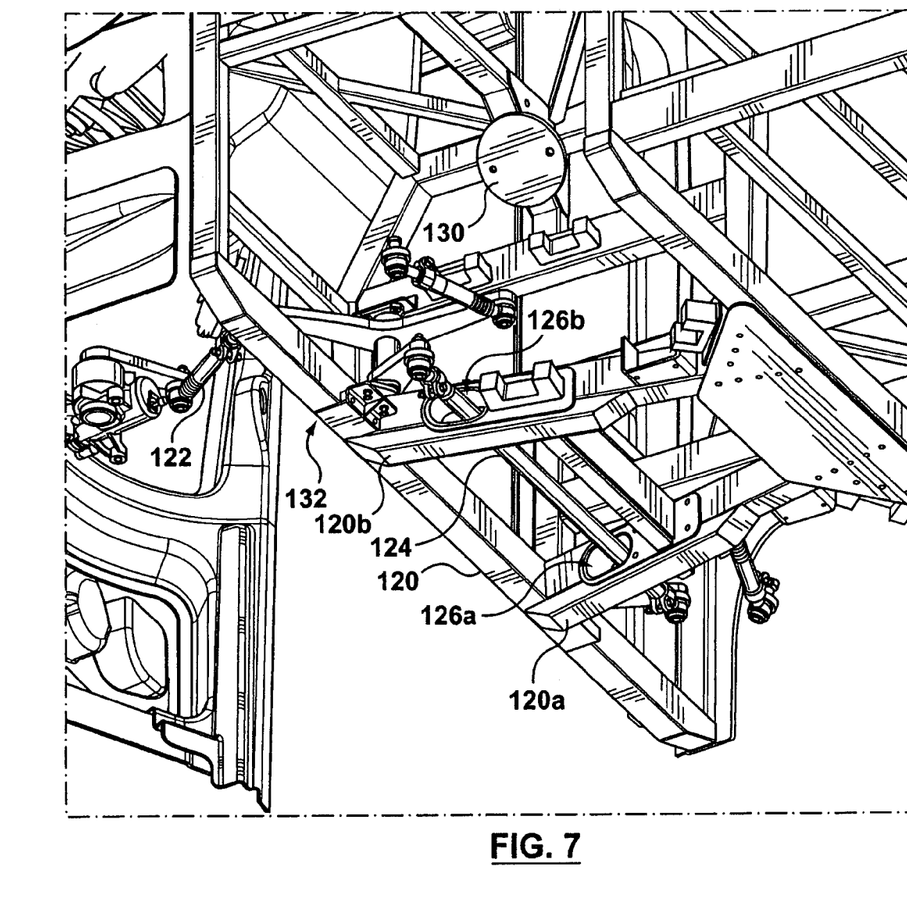

Turning to FIG. 5, to allow vehicle 10 to kneel at its rear end, each of the rear wheels 16a, 16b may be joined to the body by a trailing arm suspension 70a, 70b, respectively. Each trailing arm suspension may comprise a swing arm 72a, 72b pivotably joined at one end to a frame cross member 74 of body 12 by a clevis mount 76 and a fluid suspension, illustrated as air bags 78a, 78b (which are also known in the art as air springs). Each air bag sits on a foot 82a, 82b of the swing arm 72a, 72b and is sandwiched between this foot and a pad within the wheel well of the body 12. (FIG. 7 illustrates such a pad 130 for the front driver's side wheel well 132.)

Each wheel 16a, 16b is pivotably joined to the free end of a respective swing arm 72a, 72b. A (schematically illustrated) pneumatic control system 84a, 84b, which may include a pneumatic pump 86 and a valve 88, controls the volume of air in each air bag.

Each swing arm 72a, 72b may be provided with a mount 92a, 92b to which an electric motor 100a, 100b may be affixed. Each electric motor 100a, 100b is coupled to a respective wheel 16a, 16b by a drive train. Each drive train may include an output shaft 102 from the electric motor 100a, 100b which shaft supports a pinion 96 meshing with a face gear 98 joined to a hub 104 of the wheel. The free end of the output shaft 102 may be rotatably supported in a bearing sleeve 106 of the swing arm 72a, 72b.

Conventional wisdom minimizes the unsprung mass of a vehicle. This conventional wisdom therefore points away from supporting electric motors 100a, 100b on the swing arms. Further, placing a motor on a swing arm places a gyroscopic load on the swing arm; this, therefore, also points away from any such configuration. In the example embodiment, these issues are ameliorated by placing the electric motors close to the pivot of the clevis mount so that there is little detraction from the performance of vehicle 10. Further, providing the motors 100a, 100b on the swing arms allows for a low floor vehicle without the need to step the floor to accommodate the motors, enhances space efficiency, and avoids the need for a constant velocity joint.

The height of the rear wheel wells and the stroke of the swing arms may be chosen such that the pneumatic control system may collapse the air bags to allow the wheels 16a, 16b to retract until the rear 90 (FIG. 2) of the body contacts the ground. The contact point with the ground will normally be the bottom of the rearmost cross-member (230 in FIG. 9A). This cross-member may have a depth of 2" (5 cm) such that the rear of the vehicle is approximately 2" (5 cm) above the ground. It is difficult to push a loaded handcart over a 2" bump. To address this, turning to FIGS. 2 and 2A, a fin 110 may project from the rear end of the cargo bay. The fin may be pivotably mounted between support plates 112a, 112b and a fluid suspension, such as an air bag 116a, 116b, may act between end flanges 114a, 114b of the fin and the support plates. The pneumatic control system 84a, 84b (FIG. 5) of each trailing arm suspension 70a, 70b may also control the air in the air bags associated with fin 110. Consequently, when air is evacuated from air bags 78a, 78b (FIG. 5) of the trailing arm suspensions, it is also evacuated from the air bags associated with the fin. Thus, the fin drops, as necessary, to contact the ground.

Pitching of the of vehicle 10 during acceleration and braking may be reduced if the clevis mount 76 is positioned such that, when the vehicle is at rest and not kneeling, the mount 76 is on, or proximate, a notional line extending from the ground contact point of the rear wheels 16a, 16b to the point of intersection of two lines: a vertical line passing through the centreline of the front wheels and a horizontal line passing through the centre of gravity of the vehicle.

Figure 2A:
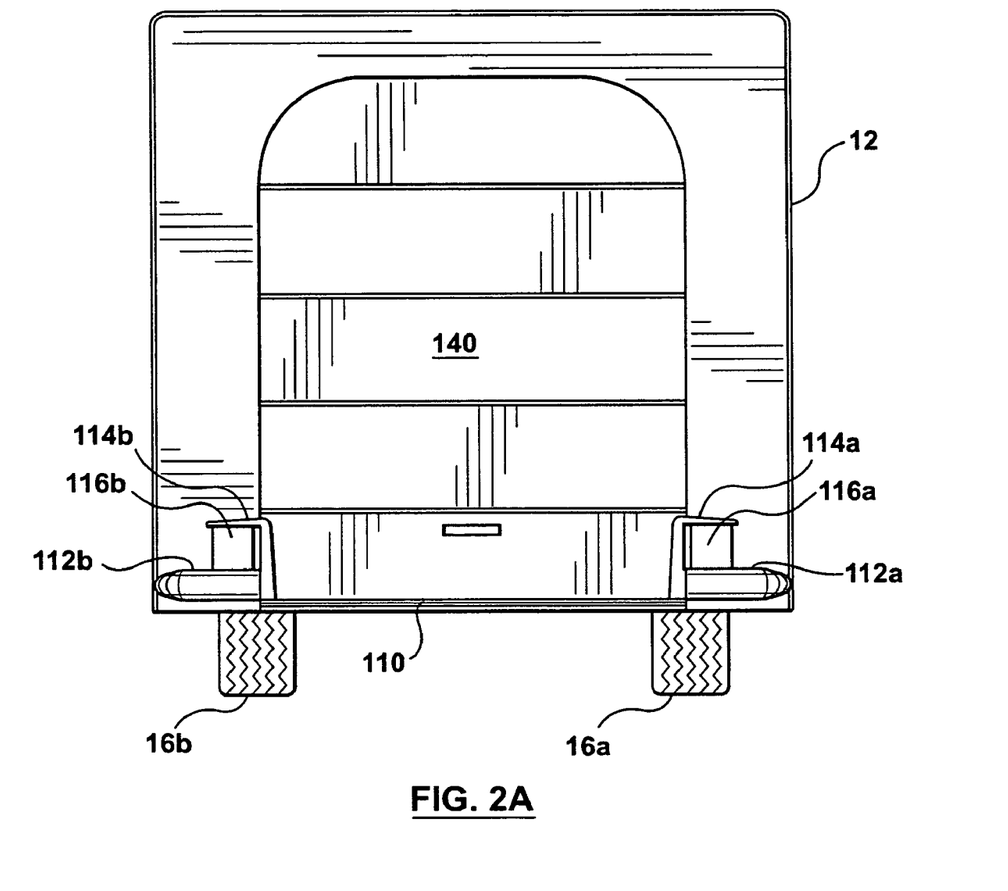
FIG. 2A is a rear view of the vehicle of FIG. 1.

As seen in FIG. 2A, the rear doorway of the vehicle may be closed with an upwardly opening roll-up door 140.

Figure 1A:
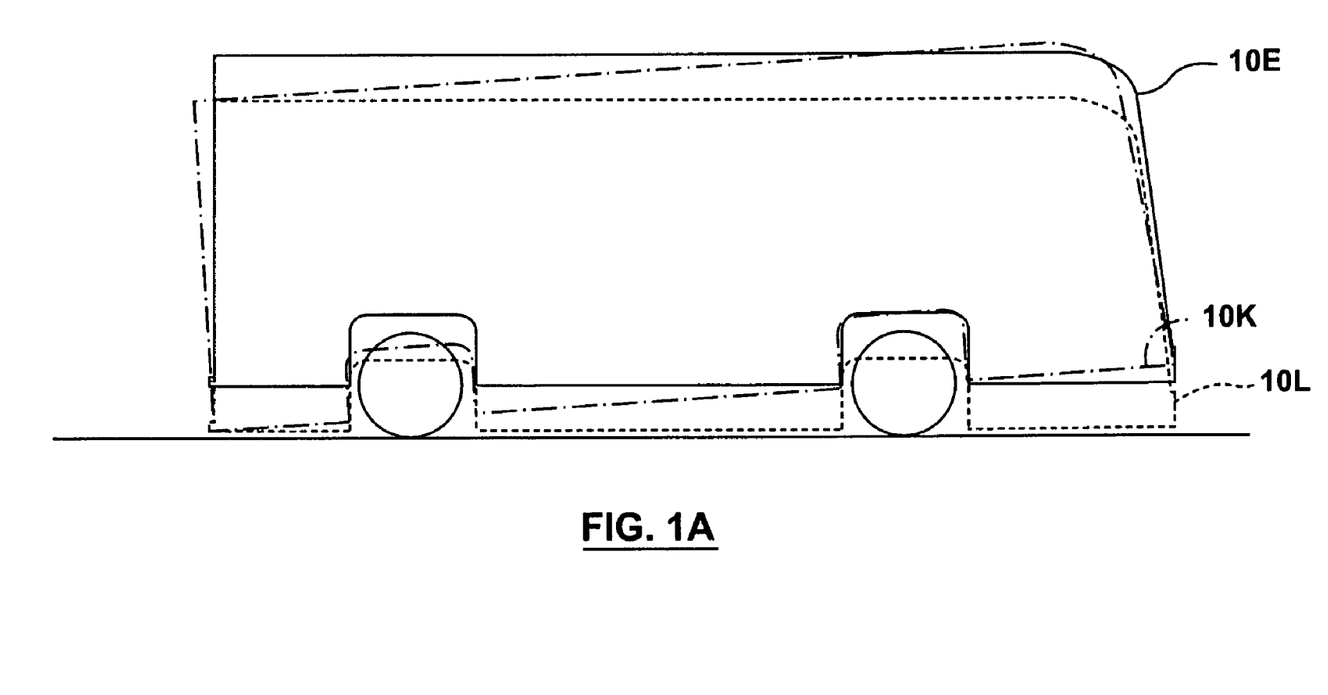
FIG. 1A is a side view of the vehicle of FIG. 1.
Figure 6:
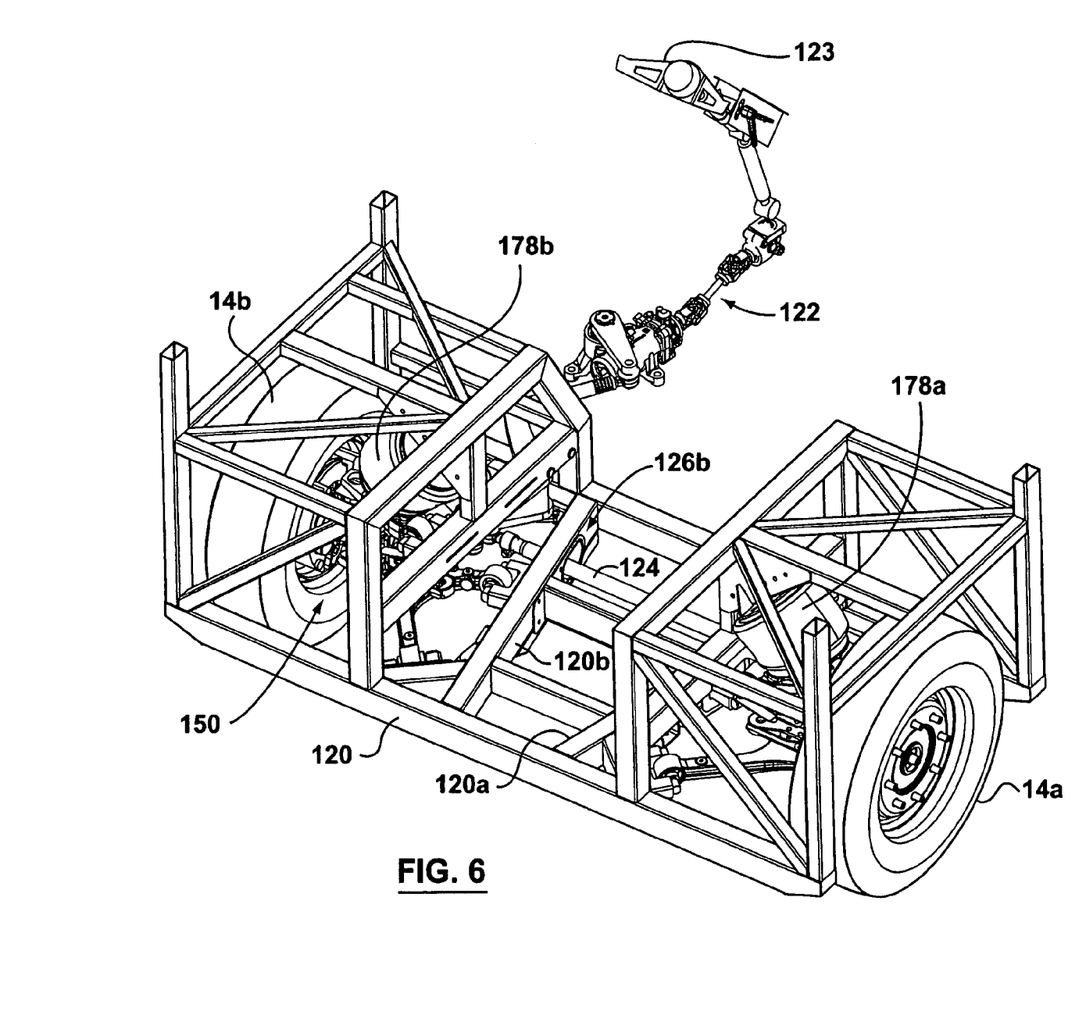

As illustrated in FIG. 6, the front wheels may be mounted by A-arm suspensions 150 and be free wheeling (i.e., not powered). Further, the neutral position of the A-frame suspensions may be established by air bladders 178a, 178b which, in one embodiment, may be evacuated, along with the evacuation of the bladders 78a, 78b (FIG. 5) of the rear wheels, in order to allow the vehicle to lie down. This is illustrated schematically in FIG. 1A where the solid line erect vehicle 10E is shown kneeling in ghost lines at 10K and lying down in ghost lines at 10L.

The driver's cab, and therefore the steering wheel, is forward of the front wheels. Where the vehicle has an uninterrupted low floor extending from the driver's cab rearward to the rear door, a problem arises in respect of the steering linkage required to couple the two sides of the front suspension. Specifically, the location of this steering linkage is constrained at the top by the low floor and at the bottom by ground clearance. For safety, it is desirable that the linkage be protected from impact with objects on the road. Because the wall/floor joint is interrupted in this area by the front wheel opening, substantial longitudinal beams are necessary on the inside perimeter of the wheel opening to carry the global tension loads and local bending loads on the floor. To place the steering linkage under these beams would make for lower than desirable ground clearance as well as expose the linkage to impact damage. To solve this problem, the linkage is run through holes centered on the neutral axes of the beams. With reference to FIGS. 6 and 7, the partial frame at the underside of the body 12 includes stiffening bars 120. A steering system 122 coupled to the steering wheel 123 of the vehicle has a transversely extending link arm 124 which allows steering of the front passenger-side wheel. Each of stiffening bars 120a and 120b is provided with a through bore 126a, 126b through which the link arm 124 extends. The through bores in the stiffening bars detract minimally from the beams' strength while preserving ground clearance and protecting the linkage from impact.

The direct drive electric motors on the trailing arm suspensions, the monocoque body, and the through bores in the partial frame members at the underside of the body to receive a steering linkage, all contribute to the construction of a low floor vehicle. Further, these features permit construction of a vehicle with an uninterrupted planar floor which extends from the side door 24 (which is in front of the front wheels), through cab-to-cargo bay doorway 22 to the rear doorway 26. This facilitates transportation of loads to and from the cargo bay.

Figure 8:
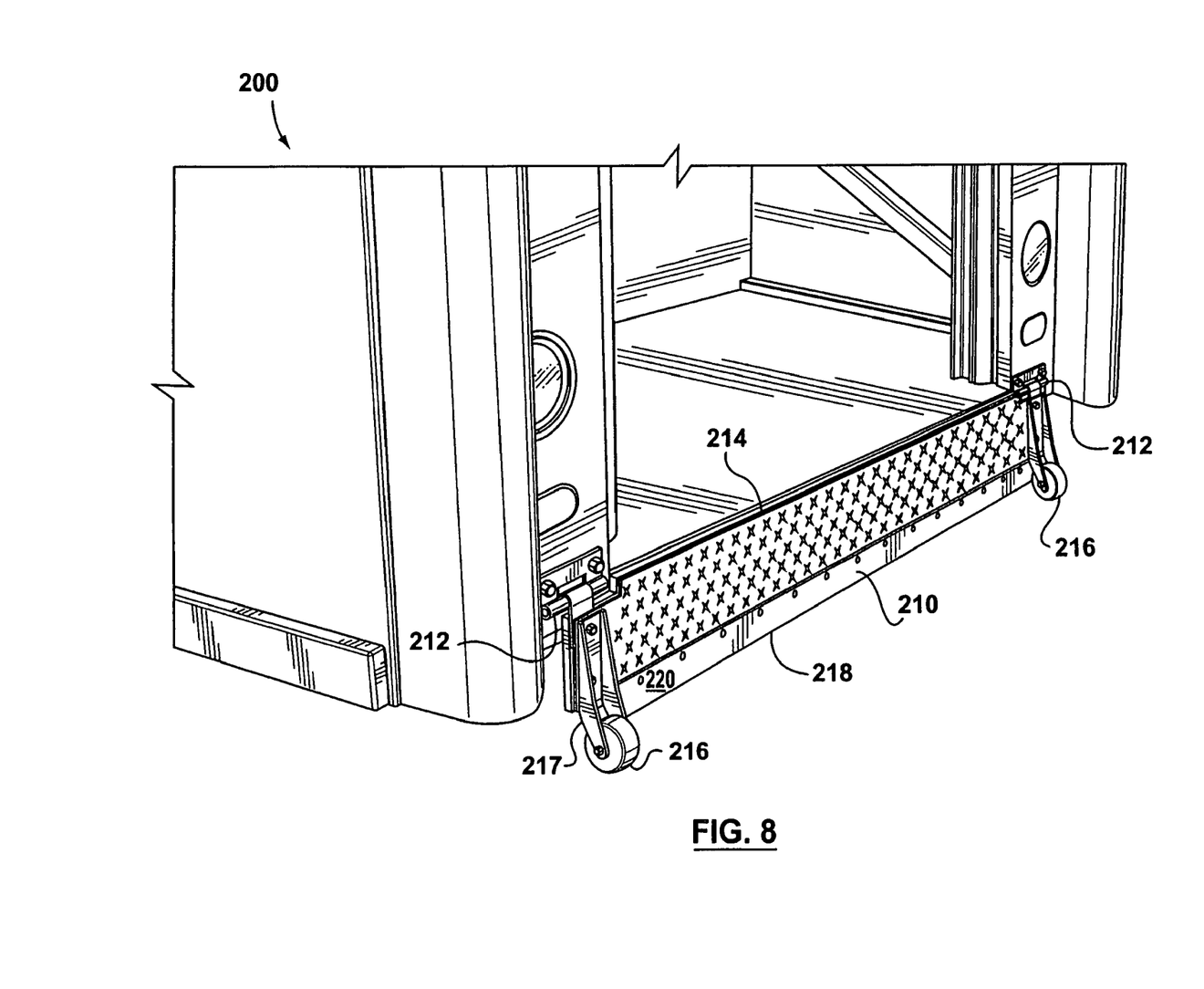
FIG. 8 is a fragmentary perspective view of a portion of a delivery vehicle made in accordance with another aspect of this invention.
Figure 9A:
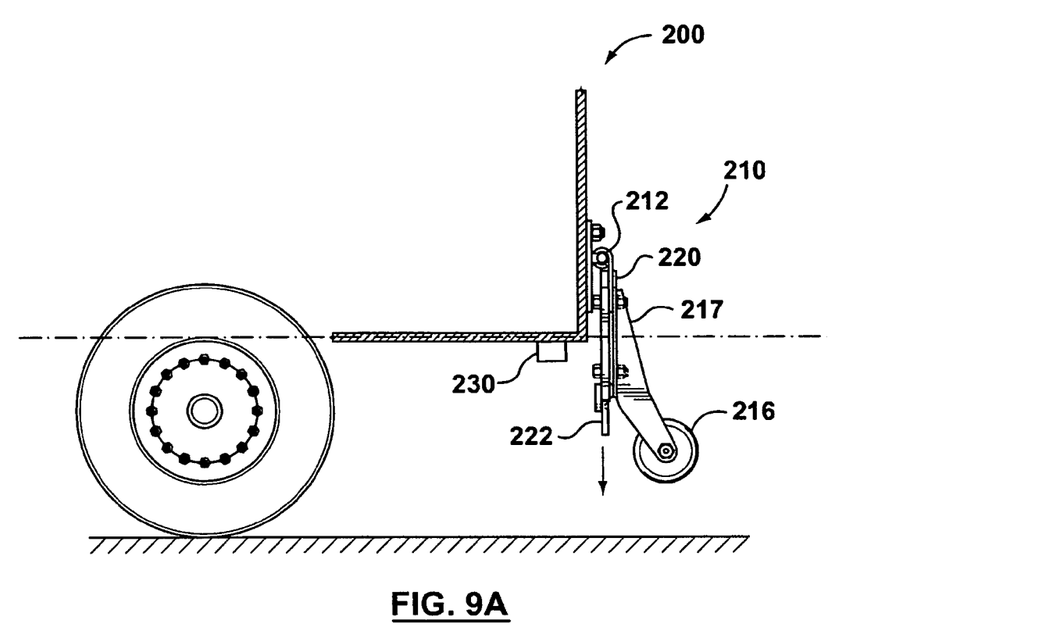
FIGS. 9A to 9D are side schematic views showing operation of the rear fin of FIG. 8.
Figure 9B:
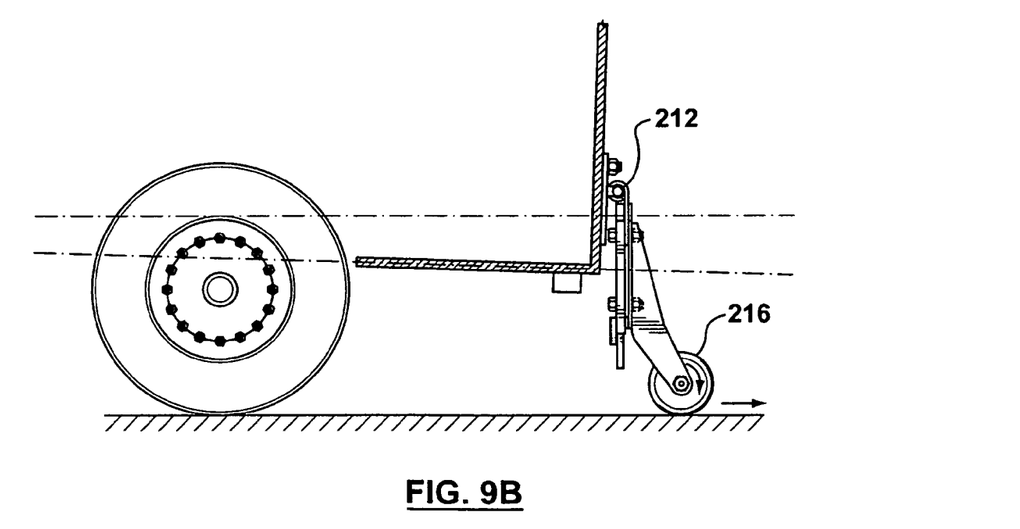
Figure 9C:
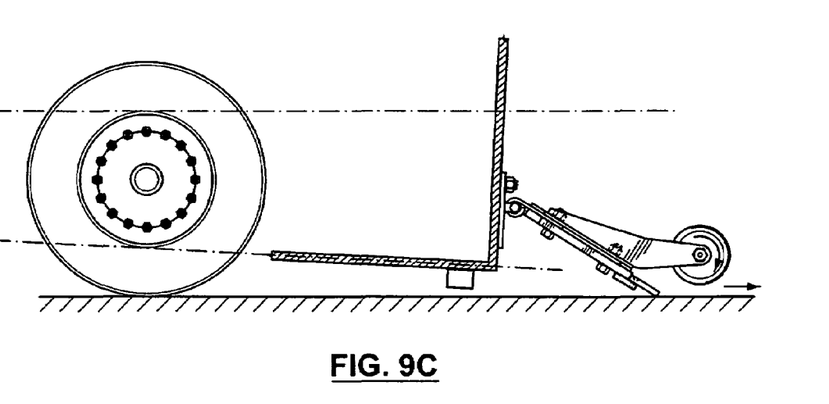
Figure 9D:
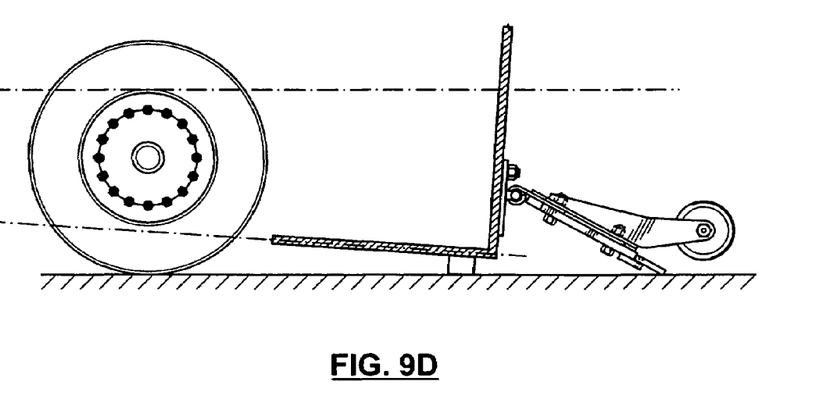
Figure 10:
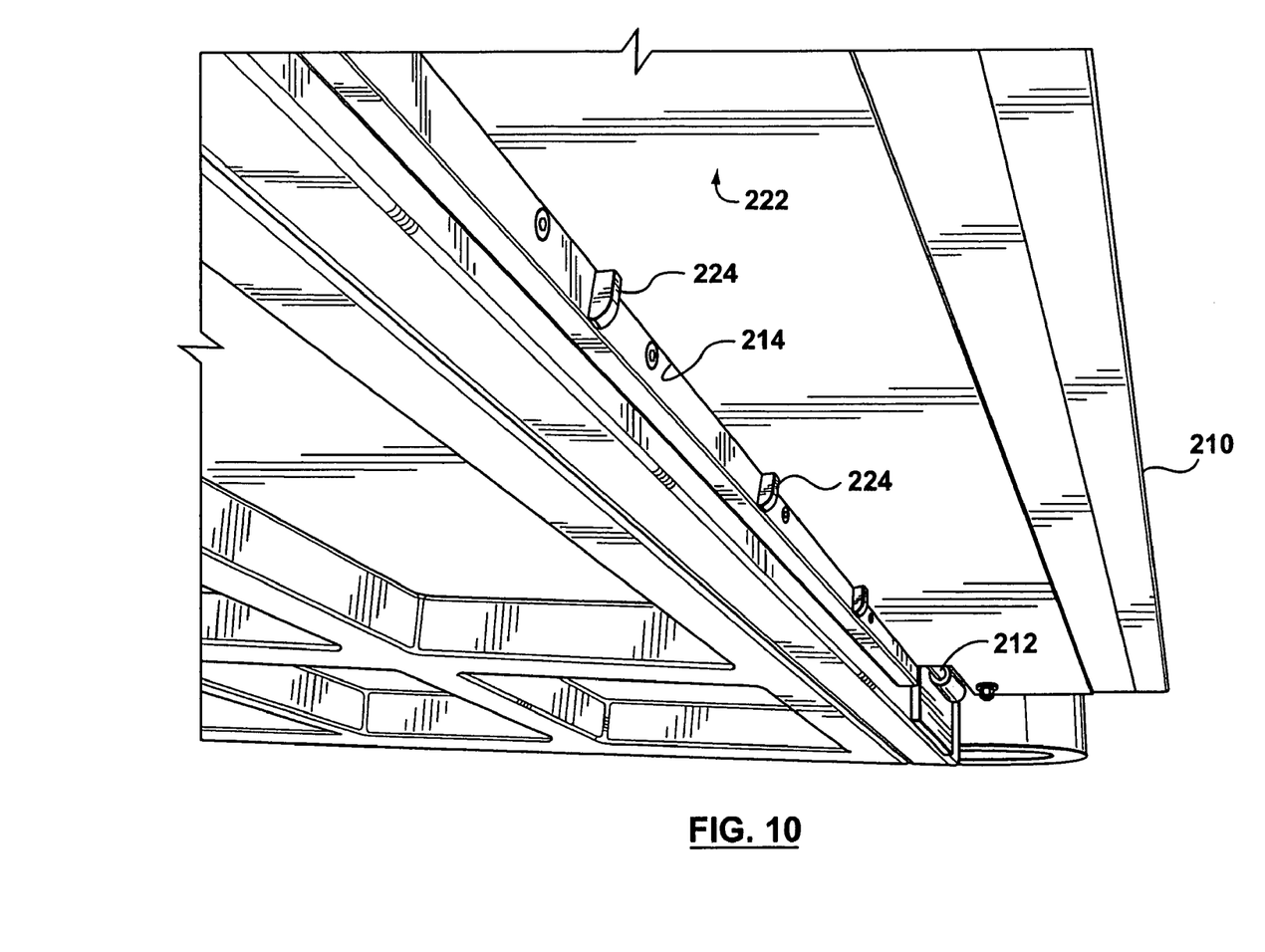
FIG. 10 is an underside fragmentary perspective view of a portion of the vehicle of FIG. 8 showing the fin in an extended position.

An alternate embodiment of the rear fin 110 (FIG. 2) is illustrated in FIG. 8. Turning to FIG. 8, fin 210 is pivotably mounted to the rear of vehicle 200 by pivots 212 that are spaced outwardly from the inner edge 214 of the fin. Wheels 216 are supported at either end of the fin by mounts 217 so as to extend outwardly beyond the outer edge 218 of the fin. These wheels also extend rearwardly beyond the platform face 220 and the pivots 212 of the fin. Each wheel 216 is backed by a shorter rubber sheet 222 (FIG. 9A). Referencing FIGS. 9A to 9D, in operation, as the vehicle 200 begins to kneel, the fin 210, led by wheels 216, descends toward the ground (FIG. 9A). When the wheels 216 contact the ground (FIG. 9B), since they are positioned rearwardly of fin pivots 212, the wheels begin to turn and cause the fin 210 to pivot toward the horizontal as kneeling progresses (FIG. 9C). As the fin 210 pivots toward the horizontal, the rearward corner of the underside of the fin will contact the ground so that with further kneeling, and pivoting of the fin 210, the wheels 216 are raised above the ground as the rearward corner of the fin scuffs along the ground (FIG. 9D). With the rearward corner of the fin in ground contact, the rubber sheet 222 is also in ground contact. The rubber sheet compliantly contacts the ground in order to assist in avoiding any gap between the ground and the fin. With reference to FIG. 10, with the fin 210 close to the horizontal, tabs 224 attached to the body of the vehicle support the inner margin of the fin to enhance the weight bearing capacity of the fin.

While each electric drive motor has been described as being mounted to a swing arm of the rear wheels proximate the pivot connection of the swing arm, each could instead be mounted proximate the free end of the swing arm so as to be, in effect, a hub mounted motor (although this would increase the unsprung weight of the vehicle). Optionally, electric drive motors could be mounted for all four wheels of the vehicle. While the power plants have been described as electric drive motors, some of the advantages of this invention would be realised with other types of drive motors, such as internal combustion engines. Further, the power plants are not necessarily mounted on the swing arms. Indeed, a single power plant could be provided between a pair of driven wheels and coupled to the wheels through some appropriate drive train. While the vehicle has been described as having a monocoque body, some of the advantages of the invention can be achieved with other types of vehicles, such as a vehicle with a frame. Also, some of the advantages of the invention may be realised for vehicles which are other than delivery vehicles, such as buses, recreation vehicles (RVs), and trucks.

Other features and advantages will be apparent to those skilled in the art and, therefore, the invention is defined in the claims.

What is claimed is:

1. A vehicle having
a pair of front wheels;
a longitudinally extending body with a driver's cab extending forwardly of said front wheels and an opening forward of said front wheels for a side door;
a rearwardly opening split side door for said opening comprising:
an upper sliding door section above said front wheels, said upper sliding door section having a downward projection toward a forward edge thereof;
an upper track extending rearwardly of said side door opening, said upper sliding side door section riding along said upper track, said track configured so that said upper sliding side door section extends longitudinally of said body both in a door closed position and in a door open position;
a lower sliding door section extending below a top of said front wheels, a forward edge of said lower side door hinged to said downward projection, said lower sliding door section riding along a lower track configured such that said lower sliding door section has an open position extending transversely of said body.

2. The vehicle of claim 1 wherein said lower sliding door section is hinged at a forward end to said downward projection of said upper sliding door section.

3. The vehicle of claim 2 wherein said upper sliding door section rides along a linear track such that said upper sliding door section has an open position extending longitudinally of said body directly over said front passenger-side wheel and wherein a rearward end of said lower sliding door section rides along said lower track and said lower track is a J-shaped track.

4. A vehicle having:
a pair of front wheels;
a longitudinally extending body with a driver's cab extending forwardly of said front wheels and an opening forward of said front wheels for a side door;
a rearwardly opening split side door for said opening, said side door comprising:

an upper sliding door section above said front wheels, said upper sliding door section having a downward projection toward a forward edge thereof;
an upper track extending rearwardly of said side door opening, said upper sliding side door section riding along said upper track, said track configured so that said upper sliding side door section extends longitudinally of said body both in a door closed position and in a door open position;
a lower door section extending below a top edge of said front wheels, a forward edge of said lower door section attached to said projection such that opening said upper sliding side door section opens said lower door section.

5. The vehicle of claim 4 wherein said lower door section is hinged to said downward projection.

6. The vehicle of claim 5 wherein a rearward end of said lower door section rides along a J-shaped track having a forward leg extending longitudinally of said body and a rearward leg extending transversely of said body such that said lower door section has an open position extending transversely of said body.

7. The vehicle of claim 6 wherein said upper track is linear and has a length such that said upper sliding door section has an open position extending directly over said front wheels.

8. The vehicle of claim 4 further comprising a lower linear, longitudinally extending, track for guiding a front edge of said lower door section.

9. The vehicle of claim 4 further comprising a lower linear track extending below said lower door section, said downward projection projecting to said lower linear track so as to be guided by said lower linear track.

10. The vehicle of claim 4, further comprising:
at least two rearward trailing arm suspensions, one proximate each side of said body, each rearward trailing arm suspension comprising a swing arm pivotably mounted at one end to said body and a fluid suspension extending between said swing arm and said body;
for each rearward trailing arm suspension, a rear wheel rotatably mounted to a free end of said swing arm;
a power plant for powering each said rear wheel; and
a control system for controlling a volume of fluid in each said fluid suspension.

11. The vehicle of claim 10 wherein a wheel well for each said rear wheel has a sufficient height and said fluid suspension provides each said swing arm with a sufficient stroke such that said fluid suspension may allow each said rear wheel to retract until a portion of said body contacts the ground.

12. The vehicle of claim 10 wherein said fluid suspension is an air bag.

13. The vehicle of claim 10 wherein said power plant for powering each said rear wheel comprises an electric motor mounted to each said swing arm.

14. The vehicle of claim 13 wherein said at least two trailing arm suspensions comprise a driver's side rearward trailing arm suspension to which a driver's side rear wheel is mounted and a passenger's side rearward trailing arm suspension to which a passenger's side rear wheel is mounted.

15. The vehicle of claim 14 further comprising, for each rearward trailing arm suspension, a drive train between an output shaft of said electric motor supporting a pinion meshing with a face gear joined to a hub of said wheel.

16. The vehicle of claim 14 wherein each pivot mounting one end of one said swing arm of one said rearward trailing arm suspension to said body, at least while each said rearward trailing arm suspension maintains said body in a generally horizontal orientation, lies on or proximate a line between a ground contact point of each said rear wheel of said vehicle and a point of intersection of (i) a vertical line passing through a centreline of front wheels of said vehicle and (ii) a horizontal line passing through a centre of gravity of said vehicle intersects.

17. The vehicle of claim 14 wherein said body is a monocoque body.

18. The vehicle of claim 17 wherein said monocoque body has at least substantially planar sides.

19. The vehicle of claim 18 further comprising at least one parcel shelf extending along an inside of, and attached to, each of said planar sides for stiffening said planar sides and resisting deflection and torsion.

20. The vehicle of claim 17 wherein said body has a planar bottom section, a top surface of said bottom section acting as a floor.

21. The vehicle of claim 20 wherein said floor is a planar uninterrupted floor from a vehicle side door through to a vehicle rear door.

22. The vehicle of claim 20 further comprising a fin extending from a rearward edge of said planar bottom section.

23. The vehicle of claim 22 wherein said fin is pivoted at said rearward edge of said planar bottom section.

24. The vehicle of claim 23 wherein said fin has at least one wheel projecting beyond its outer edge and projecting rearwardly of a pivot axis of said fin.

25. The vehicle of claim 20 further comprising a steering linkage having a link arm and wherein said body comprises stiffening bars below said bottom section and one or more of said stiffening bars is provided with a through bore through which said link arm extends.

26. The vehicle of claim 10 wherein said body has a rear door.

27. The vehicle of claim 26 wherein said rear door opens upwardly.

* * * * *

UNITED STATES PATENT AND TRADEMARK OFFICE
CERTIFICATE OF CORRECTION

PATENT NO.        : 7,651,153 B2
APPLICATION NO.   : 11/488483
DATED             : January 26, 2010
INVENTOR(S)       : Martin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 514 days.

Signed and Sealed this

Twenty-third Day of November, 2010

David J. Kappos
*Director of the United States Patent and Trademark Office*